United States Patent [19]

Epworth

[11] Patent Number: 4,625,305
[45] Date of Patent: Nov. 25, 1986

[54] MULTIPLEXING OF OPTICAL SIGNALS

[75] Inventor: Richard E. Epworth, Bishop's Stortford, England

[73] Assignee: International Standard Electric Corporation, New York, N.Y.

[21] Appl. No.: 411,755

[22] Filed: Aug. 26, 1982

[30] Foreign Application Priority Data

Sep. 1, 1981 [GB] United Kingdom ................. 8126498

[51] Int. Cl.⁴ ............................................... H04B 9/00
[52] U.S. Cl. ........................................... 370/1; 370/3; 455/609; 455/610
[58] Field of Search .......................... 370/1, 2, 3, 4; 455/608, 609, 610, 611, 612, 613, 617, 618; 372/44, 50, 19

[56] References Cited

U.S. PATENT DOCUMENTS

| | | | |
|---|---|---|---|
| 3,590,248 | 6/1971 | Chatterton | 370/3 |
| 3,723,903 | 3/1973 | Paoli et al. | 372/44 |
| 3,755,676 | 8/1973 | Kinsel | 370/1 |
| 3,761,716 | 9/1973 | Kapron et al. | 370/2 |
| 4,185,891 | 1/1980 | Kaestner | 350/167 |
| 4,204,771 | 5/1980 | Shull et al. | 356/346 |
| 4,232,385 | 11/1980 | Hara et al. | 370/3 |
| 4,246,548 | 1/1981 | Rutz | 372/44 |
| 4,314,210 | 2/1982 | Everett | 372/18 |
| 4,319,807 | 3/1982 | Horton | 350/6.4 |

FOREIGN PATENT DOCUMENTS 8116826  3/1983  France ................................. 370/1

OTHER PUBLICATIONS

Lengyel, Bela A., *Introduction to Laser Physics*, John Wiley and Sons, Inc., 1966, pp. 67–71.

*Primary Examiner*—Joseph A. Orsino, Jr.
*Attorney, Agent, or Firm*—John T. O'Halloran; Robert P. Seitter

[57] ABSTRACT

In an optical transmission system in which a plurality of optical signal channels is multiplexed before transmission along a common optical path to a receiver, each channel is produced by means of a respective multimode injection laser, the overall cavity length of each laser being arranged to provide a multimode spectral output with a respective intermode spacing which differs from that provided by the other lasers for channel discrimination purposes. Comb filters are employed for demutliplexing.

14 Claims, 9 Drawing Figures

MULTIPLEXING OF OPTICAL SIGNALS

BACKGROUND OF THE INVENTION

The present invention relates to the transmission of optical signals and in particular to the multiplexing of a plurality of optical signal channels.

The currently most widely used approach to multiplexing optical signal channels is to assign a frequency range to each of the channels, and so to choose the ranges as not to overlap. This approach, obviously, requires the use of a considerable portion of the available spectrum for the accommodation of only a relatively small number of optical signal channels. Moreover, since the respective ranges may drift with time, it is necessary either to so select the widths of the ranges that the optical signal channels will not run into one another even under the worst case conditions, or to accept a certain amount of persistent interference between the channels. The latter alternative is usually unacceptable, so that the number of channels which can be multiplexed for transmission through a common optical path is further reduced due to the broadening of the ranges dedicated to the individual channels.

SUMMARY OF THE INVENTION

Accordingly, it is a general object of the present invention to avoid the disadvantages of the prior art.

More particularly, it is an object of the invention to devise a method of multiplexing optical signal channels for transmission in a common optical path, which does not possess the disadvantages of the conventional methods of of this kind.

Still another object of the present invention is to develop a method of transmitting multiplexed optical signal channels in a common optical path, which renders it possible to considerably increase the number of channels which can be transmitted over a portion of the available spectrum without persistent interference between the channels.

A concomitant object of the invention is to provide an optical signal transmission system which is especially suited for performing in accordance with the method of the present invention.

It is yet another object of the present invention to so construct the optical signal transmission system as to be simple in construction, relatively inexpensive to manufacture, easy to use, and reliable in operation nevertheless.

In pursuance of these objects and others which will become apparent hereafter, one feature of the present invention resides in a method of transmitting optical signals including the step of multiplexing a plurality of optical signal channels, wherein each optical signal channel is produced by means of a respective multimode injection laser, the overall cavity length of each laser being arranged to provide a multimode spectral output with a respective intermode spacing which differs from that provided by the other lasers for channel discrimination purposes, the outputs of the multimode lasers being combined for passage along a common optical path.

According to another aspect of the present invention, there is provided an optical signal transmission system including a transmitter, an optical path and a receiver, wherein a plurality of optical signal channels is multiplexed in the transmitter, each optical signal channel being produced by means of a respective multimode injection laser, the overall cavity length of each laser being such as to provide a multimode spectral output with a respective intermode spacing which differs from that provided by the other lasers for channel discrimination purposes, and the outputs of the multimode lasers being combined for transmission to the receiver along the optical path.

BRIEF DESCRIPTION OF THE DRAWING

Above-mentioned and other features and objects of this invention will become more apparent by reference to the following description taken in conjunction with the accompanying drawing, in which.

DETAILED DESCRIPTION OF THE PREFERRED EMBODIMENTS

Figure 1:
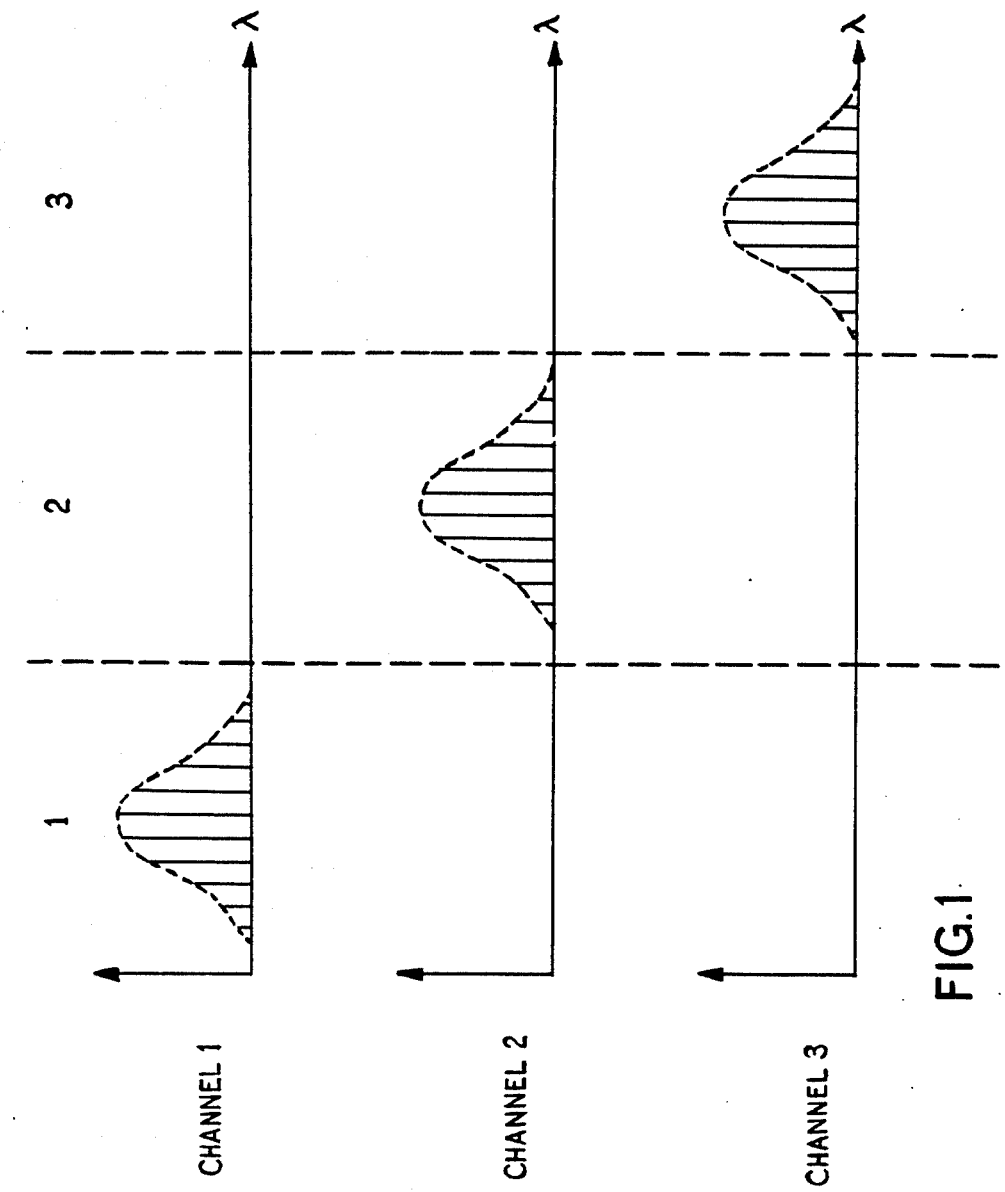
FIG. 1 is a graphic representation of conventional wavelength multiplexing.
Figure 2:
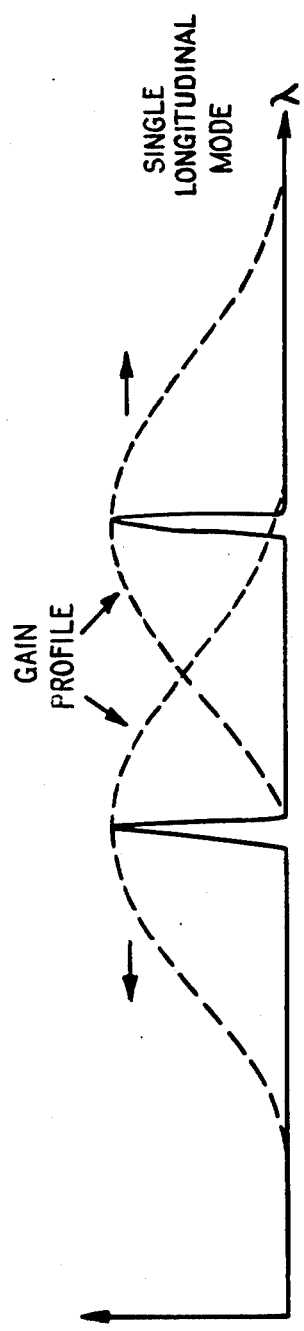
FIG. 2 is a graphic representation of gain profile drift for a single mode laser.

As mentioned above, wavelength multiplexing is conventionally employed for multiplexing optical signals, but this has various disadvantages. FIG. 1 illustrates conventional three channel wavelength multiplexing employing three single longitudinal mode lasers. The spectral output for each laser (each channel) relative to the other lasers is indicated. The narrow output spectrum of single longitudinal mode injection lasers (see FIG. 2) makes them attractive for use in wavelength multiplex fiber systems as the optical signal sources. However, the narrower the spectral width of a source, the longer is its coherence time. If the coherence time is longer than the intermode delays in a multimode fiber system, then modal noise can be generated by any mode selective loss. For this reason, the ideal source of a multimode fiber system would have a broad spectral width and hence a short coherence time. The wavelength of a particular laser is a function of various processing conditions, and, therefore, lasers operating at the various channel wavelengths must be selected after manufacture if closely spaced channels are used. Since the operating wavelength of single longitudinal mode injection lasers varies with both temperature and aging, considerable channel spacing is necessary to prevent one channel from drifting into another. The gain profile drifts with temperature and time are illustrated in FIG. 2.

Multiple longitudinal mode lasers (multimode lasers) have a broad output spectrum and, therefore, a short coherence time, making them particularly attractive for use as optical signal sources by virtue of their low modal noise properties.

Figure 3:
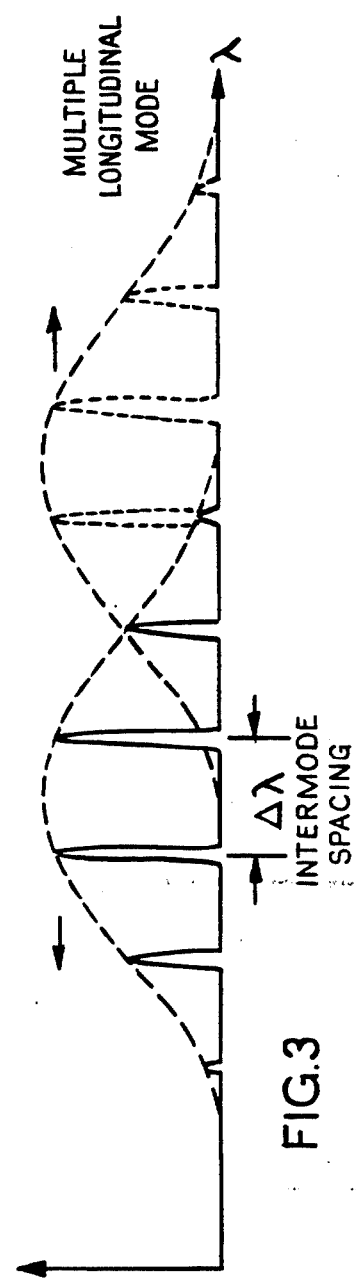
FIG. 3 is a graphic representation similar to that of FIG. 2 but for a multimode laser.

When a laser oscillates in multiple longitudinal modes, the line spacing $\Delta\lambda$ between modes (spectral lines) is determined by the effective source cavity length L in accordance with the equation $\Delta\lambda/\lambda = \lambda 2L$. The left-hand solid line graph of FIG. 3 illustrates the spectral output of one such multiple longitudinal mode laser. The envelope of these spectral lines is determined predominantly by the gain profile of the laser. Thus, the number of longitudinal modes or lines will be proportional to the cavity length.

In contradistinction to the prior art, the present invention proposes a multiplexed transmission system in which channel separation is achieved not by wavelength but by effective source cavity length, the channel thus being discriminated by means of mode (line) spacing. Such a technique may be referred to as cavity length multiplex or multimode mode spacing multiplex.

The matched filter for such a source is a comb filter, and such a comb filter may be provided by the use of a Fabry-Perot etalon with a cavity length equal to that of the source, as is described in greater detail hereinafter.

Figure 4:
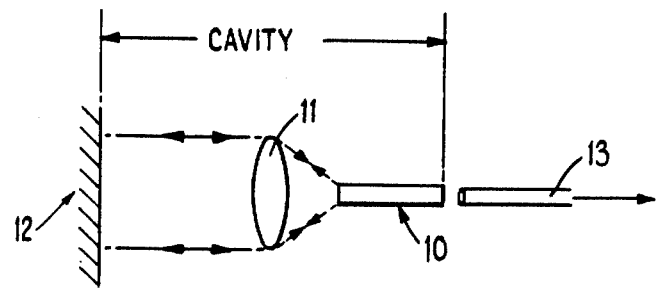
FIGS. 4 to 7 are diagrammatic side elevational views of four different examples of arrangements for setting the intermode spacing of multimode lasers according to the invention.
Figure 5:
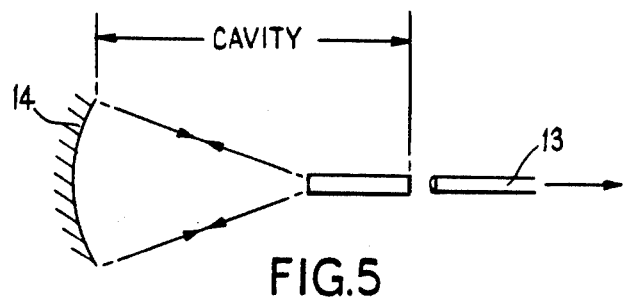

Each multimode laser whose output is to be multiplexed with others, therefore, must have its intermode o spacing $\Delta\lambda$ set to a particular value to provide the associated channel. This may be achieved in various ways, examples of which will now be described with reference to FIGS. 4, 5, 6 and 7. In FIGS. 4 and 5, the overall (effective) laser cavity has an external rear reflector (mirror) whose position determines the cavity length and thus the intermode spacing. In FIG. 4 the output of the rear face of a laser chip 10 is collimated by means of a lens 11 onto a plane mirror 12 which constitutes one end of the cavity. The rear face of the laser chip may be coated with an anti-reflection material to reduce the effect of the cavity in the laser itself. The front face of the laser acts as the other (partial) reflector from which the laser output is delivered to a fiber 13. The intermode spacing can be adjusted simply by moving the mirror 12 to adjust the cavity length and the number of longitudinal modes. The mirror 12 may be made less than 100% reflective in order to allow a small amount of power to pass therethrough to a monitor/detector arranged behind it, if desired. A feedback control of the laser may thus be provided. The FIG. 5 arrangement is similar to that of FIG. 4, a spherical (concave) mirror of the correct focal length replacing the lens 11 and the plane mirror 12. Means may be included to vary the focal length of the concave mirror.

Figure 6:
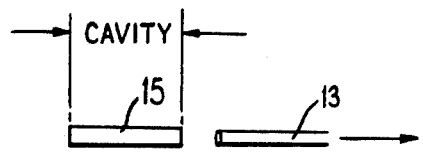

FIG. 6 illustrates the simplest possible example, the cavity simply being that of the laser itself, the channel setting (intermode spacing) being obtained by cleaving the laser 15 to the appropriate length. The disadvantage of such an arrangement is that the long cavities necessary for a large number of longitudinal modes tend to result in high laser threshold currents because the semiconductor material is lossy.

Figure 7:
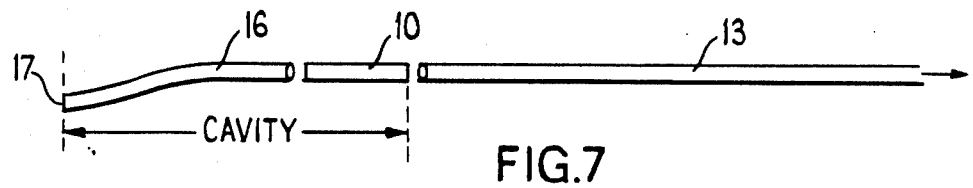

FIG. 7 illustrates an example in which additional cavity length to that provided by the laser 10 itself is provided by a single mode guide or fiber section 16, arranged behind the laser chip 10, which constitutes an external cavity. This fiber section 16 could alternatively be located between the laser and the system fiber 13. The mode spacing is set by adjusting the length of this guide or fiber section 16. The far end 17 of the guide or fiber section 16 should be fully or partially silvered in the FIG. 7 arrangement. Preferably, the laser chip 10 or 15 should be of the stable multimode type ensuring multimode operation at all times, not just mode jumping. In the FIGS. 4, 5 and 7 arrangements, the external cavity must dominate over all the other cavities if it is to determine the spacing of the longitudinal modes. The outputs of a plurality of such multimode lasers with different intermode spacings are combined for transmission to a receiver along a common optical path by means, for example, of a fused core fiber mixer.

Figure 8:
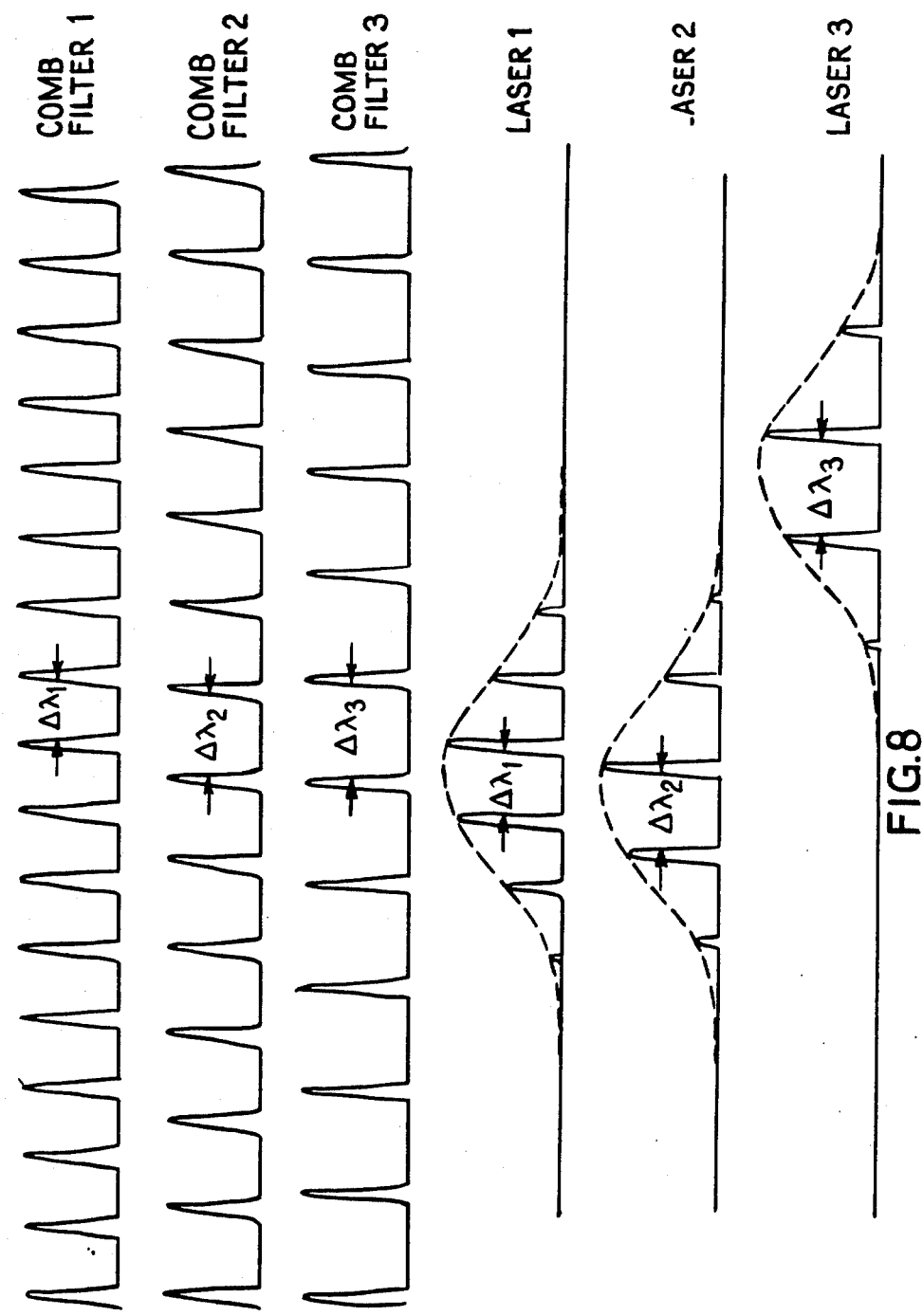
FIG. 8 is a graphic representation of the operation of three multimode lasers and their associated comb filters for three channel cavity length multiplexing in accordance with the invention.
Figure 9:
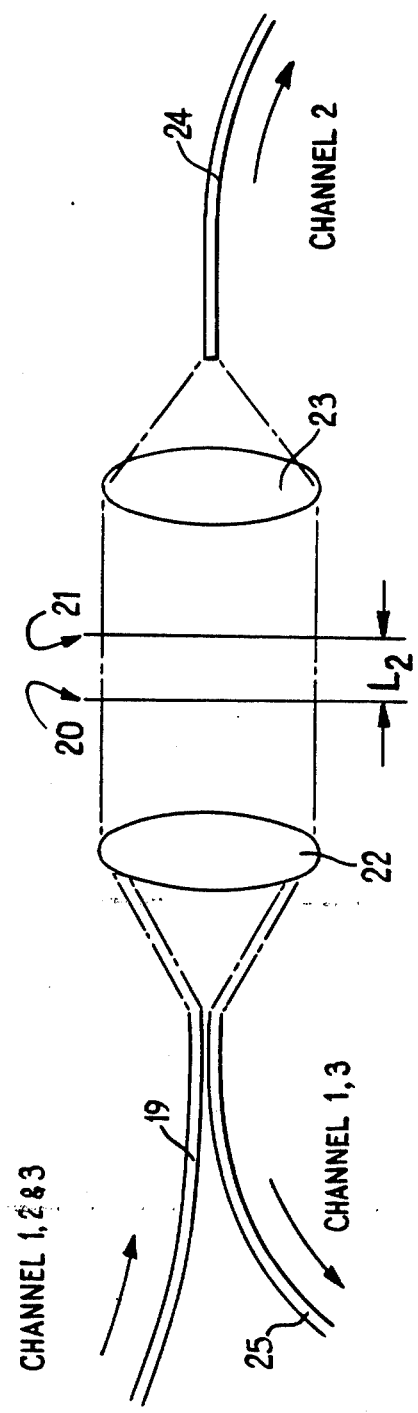
FIG. 9 is a diagrammatic side elevational view of a channel separating etalon for use in a demultiplexer.

A demultiplexer for cavity length multiplexed optical signals comprises a comb filter for each channel. FIG. 8 shows the operation of the three comb filters F1, F2, F3 required for demultiplexing the cavity length multiplexed outputs of three multimode lasers L1, L2, L3 having intermode spacings $\Delta\lambda_1$, $\Delta\lambda_2$ and $\Delta\lambda_3$, respectively, which outputs have been transmitted along the common optical path. As previously mentioned, the comb filters may each be implemented by Fabry-Perot etalons which comprise spaced partially reflecting i.e., semi-silvered, mirrors 20 and 21 (FIG. 9). The spacing between the mirrors determines the channel selected. Such components may be integrated in the fiber or in integrated optics.

A received signal, comprising channels 1, 2 and 3, at the end of fiber 19 may be separated out by collimating the beam, by means of a lens 22. If the etalon has a spacing $L_2$, where $L_2 = \Delta_2^2/2\Delta\lambda_2$, only light corresponding to channel 2 is passed by the etalon to lens 23 and thence to an output fiber 24. Light corresponding to channels 1 and 3 is reflected by the etalon to a fiber 25. Channels 1 and 3 may be separated in a similar manner with an etalon of suitable spacing, $L_1$ or $L_3$. The etalon cavity length (mirror spacing) corresponds to the effective (overall) cavity length of the corresponding multimode laser.

Thus each receiver would incorporate a presettable etalon, in an expanded beam arrangement, such that only light at wavelengths coincident with the "teeth" of the comb filter will pass therethrough, all other light being reflected and coupled back into a further fiber 25. The reflected light is passed to a further etalon, and so on until all of the channels have been separated. The spanning of the receiver etalon must be accurately matched to that of the source. It may be necessary to use self tracking receiver etalon when using a semiconductor laser source as the effective canting length can vary with drive current and temperature.

If the cavity lengths for each channel are appropriately chosen, for example not harmonically related, then the worst but intermittent crosstalk would occur when one line from an unwanted channel is coincident with one "tooth" of the comb filter.

The advantage of cavity length multiplexing is that the system will continue to operate at whatever mean wavelength the laser chooses to emit, whether the channels overlap or not, thus completely overcoming the need for source selection on the basis of wavelength, temperature control or problems due to wavelength changes with age. This is achieved by taking advantage of the gaps in the spectrum, and discriminating the channels by means of the mode spacing. The system is immune to changes in mean center frequency. While the invention has been specifically described with reference to multiplexing three channels, it can be applied to multiplexing other pluralities of channels.

While I have described above the principles of my invention in connection with specific apparatus, it is to be clearly understood that this description is made only by way of example and not as a limitation to the scope of my invention as set forth in the accompanying claims.

I claim:

1. A method of transmitting a plurality of multiplexed optical signal channels in a common optical path, comprising the steps of generating the individual optical signal channels in respective multimode injection lasers having respective overall cavity lengths arranged to each produce a multimode spectral output having associated spectral components with an intermode spacing differing from that between the spectral components of the output of each of the other lasers for channel discrimination purposes;

multiplexing the individual optical signal channels into the common optical path for propagation as a combined optical signal in the latter; and optically demultiplexing the combined optical signal to reconstitute the individual optical channels from the respective associated spectral components by discrimination on the basis of the respective intermode spacings.

2. The method as defined in claim 1, wherein said generating step includes defining at least one of the laser cavities between a multimode laser chip and a planar mirror arranged rearwardly from the chip, interposing a lens between the chip and the planar mirror to collimate the beam emerging rearwardly from the chip onto the planar mirror, and adjusting the spacing between the lens and the planar mirror to thereby set the overall cavity length and thus the intermode spacing for the particular channel.

3. The method as defined in claim 1, wherein said generating step includes defining at least one of the laser cavities between a multimode laser chip and a concave mirror focused at the rear of the chip, and varying the focal length of the concave mirror to thereby set the overall cavity length and thus the intermode spacing for the particular channel.

4. The method as defined in claim 1, wherein said generating step includes defining at least one of the laser cavities between a multimode laser chip and a section of a single mode optical fiber section arranged in series with the chip, and varying the length of the optical fiber section to thereby set the overall cavity length and thus the intermode spacing for the particular channel.

5. The method as defined in claim 1, wherein said generating step includes defining at least one of the laser cavities in a multimode laser chip, and choosing the length of the chip to thereby set the overall cavity length and thus the intermode spacing for the particular channel.

6. The method as defined in claim 1; wherein the step of demultiplexing the combined optical signal channels after the passage thereof through the common optical path includes comb filtering the individual optical signal channels.

7. The method as defined in claim 6, wherein said comb filtering includes, for the particular optical signal channel, passing the respective optical signal channels through a Fabry-Perot etalon including a pair of semi-silvered mirrors spaced from one another by a distance equal to the overall cavity length of the respective laser which had generated the particular optical signal channel.

8. A transmission system for transmitting a plurality of multiplexed optical signal channels in a common optical path, comprising a transmitter including a plurality of multimode injection lasers, one for each of the optical signal channels, and each having such an overall cavity length as to produce a multimode spectral output having associated spectral components with an intermode spacing differing from that between the spectral components of the output of each of the other lasers for channel discrimination purposes;

means for multiplexing the optical signal channels into the common optical path for propagation as a combined optical signal in the latter; and a receiver for the multiplexed optical signal channels interposed in said common optical path downstream of said transmitter and including means for optically demultiplexing the combined optical signal to reconstitute the individual optical channels from the respective associated spectral components by discrimination on the basis of the respective intermode spacings.

9. The transmission system as defined in claim 8, wherein at least one of said lasers includes a multimode laser chip and a planar mirror arranged rearwardly from said chip and defining the respective cavity therewith, and a lens interposed between said chip and said planar mirror and operative for collimating the beam emerging rearwardly from the chip onto the planar mirror; and further comprising means for changing the overall length of said cavity to thus set the intermode spacing for the particular channel, including means for mounting said planar mirror for movement toward and away from said chip, and means for moving said planar mirror.

10. The transmission system as defined in claim 8, wherein at least one of said lasers includes a multimode laser chip and a concave mirror focused at the rear of said laser chip and defining the respective cavity with said chip; and further comprising means for changing the overall length of said cavity to thus set the intermode spacing for the particular channel, including means for varying the focal length of said concave mirror.

11. The transmission system as defined in claim 8, wherein at least one of said lasers includes a multimode laser chip and a single mode optical fiber section arranged in series with said chip and defining the respective cavity therewith; and further comprising means for changing the overall length of said cavity to thus set the intermode spacing for the particular channel, including means for varying the length of said fiber section.

12. The transmission system as defined in claim 8, wherein at least one of said lasers includes a multimode laser chip having a length chosen to set the intermode spacing for the particular channel.

13. The transmission system as defined in claim 8; wherein said means for demultiplexing said multiplexed optical signal channels, includes at least one comb filter.

14. The transmission system as defined in claim 13, wherein said comb filter is associated with a particular optical signal channel and includes a Fabry-Perot etalon including a pair of semi-silvered mirrors spaced from one another by a distance equal to the overall length of said cavity of the respective laser producing said particular optical signal channel.

* * * * *